US012811873B2

(12) United States Patent
Mermoud et al.

(10) Patent No.: US 12,811,873 B2
(45) Date of Patent: Nov. 24, 2026

(54) NETWORK LOCALIZATION BASED ON PROBING RESULTS

(71) Applicant: Cisco Technology, Inc., San Jose, CA (US)

(72) Inventors: Grégory Mermoud, Venthône (CH); Jean-Philippe Vasseur, Saint Martin d'Uriage (FR)

( * ) Notice: Subject to any disclaimer, the term of this patent is extended or adjusted under 35 U.S.C. 154(b) by 591 days.

(21) Appl. No.: 17/853,526

(22) Filed: Jun. 29, 2022

(65) Prior Publication Data

US 2024/0007387 A1 Jan. 4, 2024

(51) Int. Cl.
*H04L 45/02* (2022.01)
*H04L 43/12* (2022.01)

(52) U.S. Cl.
CPC .............. *H04L 45/08* (2013.01); *H04L 43/12* (2013.01)

(58) Field of Classification Search
CPC ..... H04L 45/08; H04L 43/12; H04L 41/5019; H04L 41/0806; H04L 43/50; H04L 41/5067; H04L 41/16; H04L 41/40; H04L 43/10; H04L 41/12; H04L 43/08
See application file for complete search history.

(56) References Cited

U.S. PATENT DOCUMENTS 7,924,927 B1 * 4/2011 Boesjes ................. H04W 40/24 375/240.26
8,527,639 B1 * 9/2013 Liskov ................ H04L 67/1021 709/228
8,989,053 B1 * 3/2015 Skaaksrud ......... G06Q 10/0836 370/255
10,021,429 B1 * 7/2018 Talvensaari ............. G06F 16/24
10,476,799 B2 * 11/2019 Chung .................. H04L 41/042
10,581,693 B2 * 3/2020 Bill ....................... H04L 41/046
10,904,125 B2 * 1/2021 Kolar .................. H04L 12/4633
11,070,453 B2 7/2021 Thiagarajan et al.
11,176,744 B2 * 11/2021 Bleyer ............... G02B 27/0101
12,212,476 B2 * 1/2025 Gupta ................. G06F 9/45558
2005/0041799 A1 2/2005 Pythoud et al.
2012/0233308 A1 * 9/2012 Van De Houten ...... H04L 43/10 709/224

(Continued)

FOREIGN PATENT DOCUMENTS

GB 2478214 A * 8/2011 ............ H04W 24/08
WO WO-2007082011 A2 * 7/2007 ............. H04L 41/00

(Continued)

OTHER PUBLICATIONS

Bar-David, et al., "Context-Aware Location Prediction", Conference Paper, Jan. 2016, 23 pages, ResearchGate.

(Continued)

*Primary Examiner* — Wutchung Chu
(74) *Attorney, Agent, or Firm* — Lee & Hayes, P.C.

(57) ABSTRACT

In one embodiment, a device obtains probe results generated by probing a plurality of entities in a network from a first node in the network. The device generates a location identifier for the first node that represents its location in the network, based on the probe results. The device selects a configuration associated with the first node for use by a second node in the network, based on a difference between the location identifier for the first node and a location identifier for the second node. The device causes the configuration to be deployed to the second node.

20 Claims, 10 Drawing Sheets

(56) References Cited

U.S. PATENT DOCUMENTS

| | | | | |
|---|---|---|---|---|
| 2015/0113131 | A1* | 4/2015 | Veenstra | G06F 11/30 709/224 |
| 2016/0003637 | A1* | 1/2016 | Andersen | G01C 21/362 701/519 |
| 2019/0028740 | A1* | 1/2019 | Talvensaari | G06F 16/24 |
| 2019/0166210 | A1* | 5/2019 | Froger | H04L 67/1021 |
| 2020/0100063 | A1* | 3/2020 | Jadav | H04L 41/0853 |
| 2020/0228497 | A1 | 7/2020 | Banerjee et al. | |
| 2020/0275360 | A1* | 8/2020 | Bordeleau | H04L 41/0806 |
| 2020/0366563 | A1* | 11/2020 | Patil | H04L 41/16 |
| 2022/0360518 | A1* | 11/2022 | Mccormick | H04L 45/22 |
| 2024/0137279 | A1* | 4/2024 | Zhang | H04L 45/02 |
| 2024/0292185 | A1* | 8/2024 | Jantzi | H04W 4/021 |
| 2025/0080436 | A1* | 3/2025 | Gupta | G06F 9/45558 |
| 2026/0039535 | A1* | 2/2026 | Weibel | H04L 41/046 |

FOREIGN PATENT DOCUMENTS

| | | | |
|---|---|---|---|
| WO | 2014144760 | 9/2014 | |
| WO | WO-2017060117 A1 * | 4/2017 | H04L 43/00 |

OTHER PUBLICATIONS

"Curse of Dimensionality", online: https://en.wikipedia.org/wiki/Curse_of_dimensionality#Distance_function, accessed Jun. 13, 2022, 6 pages, Wikimedia Foundation, Inc.

* cited by examiner

NETWORK LOCALIZATION BASED ON PROBING RESULTS

TECHNICAL FIELD

The present disclosure relates generally to computer networks, and, more particularly, to network localization based on probing results.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs and satisfy the quality of service (QoS) requirements of the traffic (e.g., in terms of delay, jitter, packet loss, etc.).

With the recent evolution of machine learning, predictive failure detection and proactive routing in an SDN/SD-WAN, as well as other networks, now becomes possible through the use of machine learning techniques, in order to maximize the user experience for a given application. As would be appreciated, though, the performance of a given model may vary considerably between different network locations. Typically, the geolocations or the Internet Protocol (IP) addresses are used to identify endpoints that are 'close' to one another in the network. However, geolocation information is often unavailable for endpoints and even IP addresses from the same block are often allocated by Internet Service Providers to different locations (e.g., different cities, etc.).

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
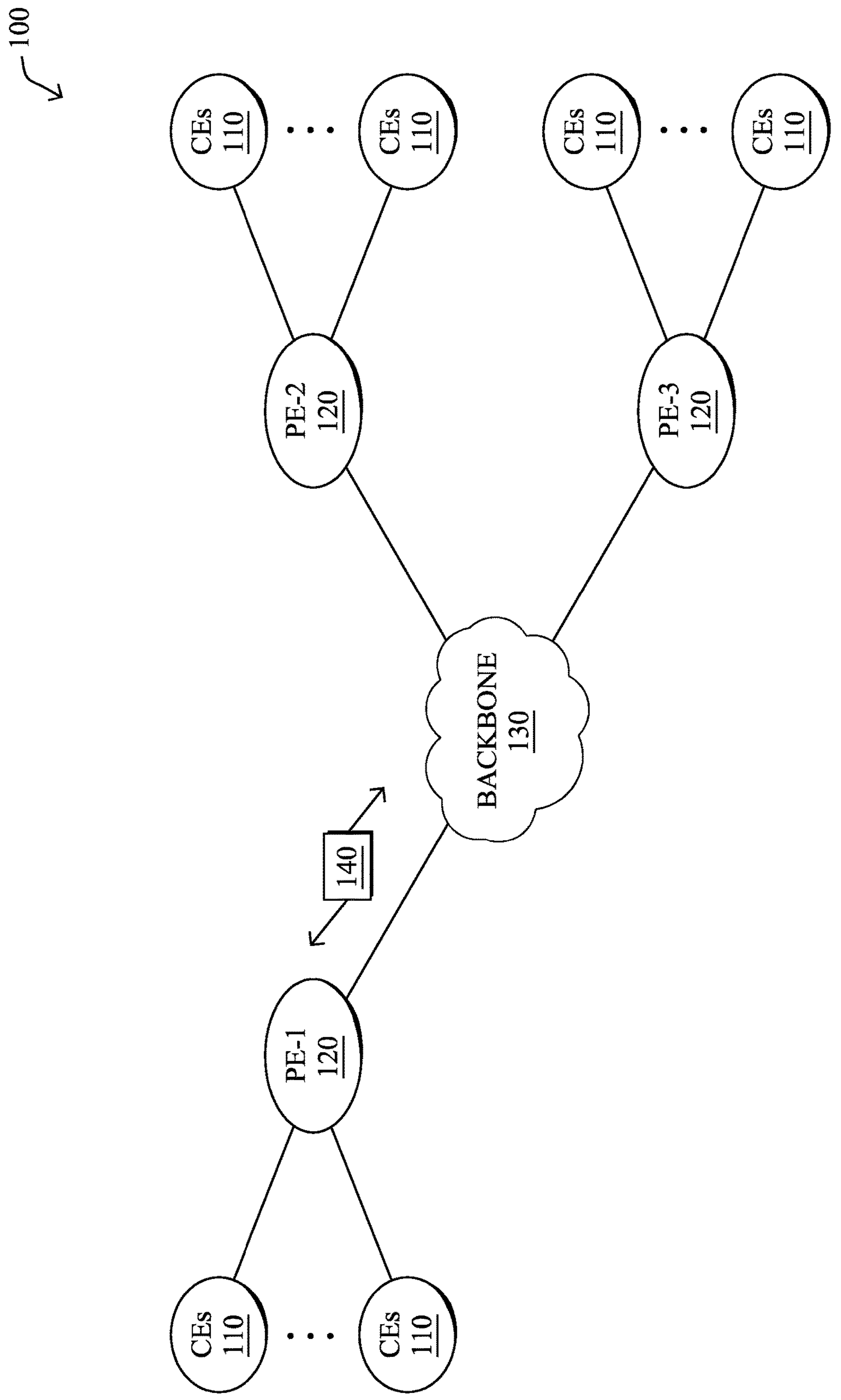
FIGS. 1A-1B illustrate an example communication network.

According to one or more embodiments of the disclosure, a device obtains probe results generated by probing a plurality of entities in a network from a first node in the network. The device generates a location identifier for the first node that represents its location in the network, based on the probe results. The device selects a configuration associated with the first node for use by a second node in the network, based on a difference between the location identifier for the first node and a location identifier for the second node. The device causes the configuration to be deployed to the second node.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
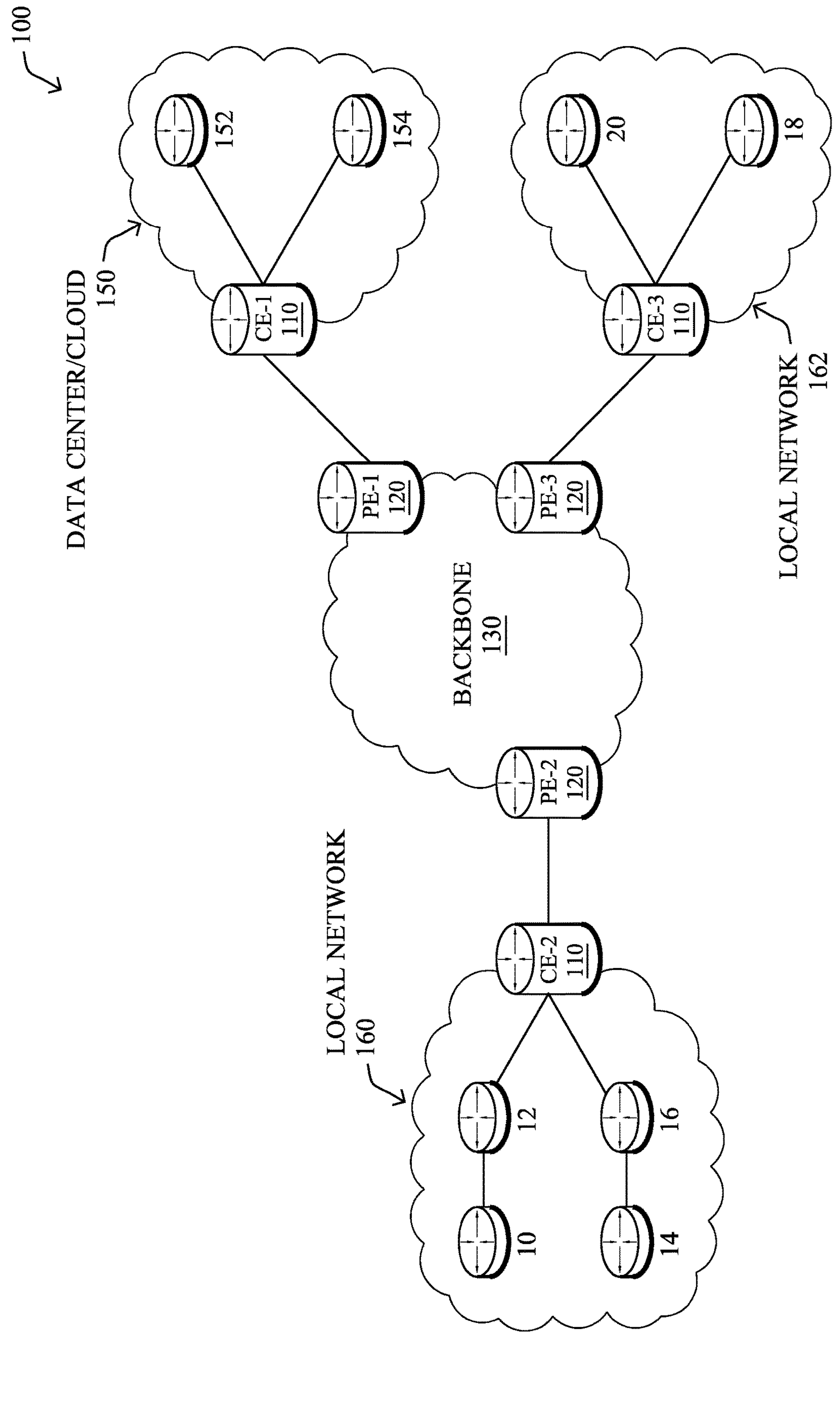

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
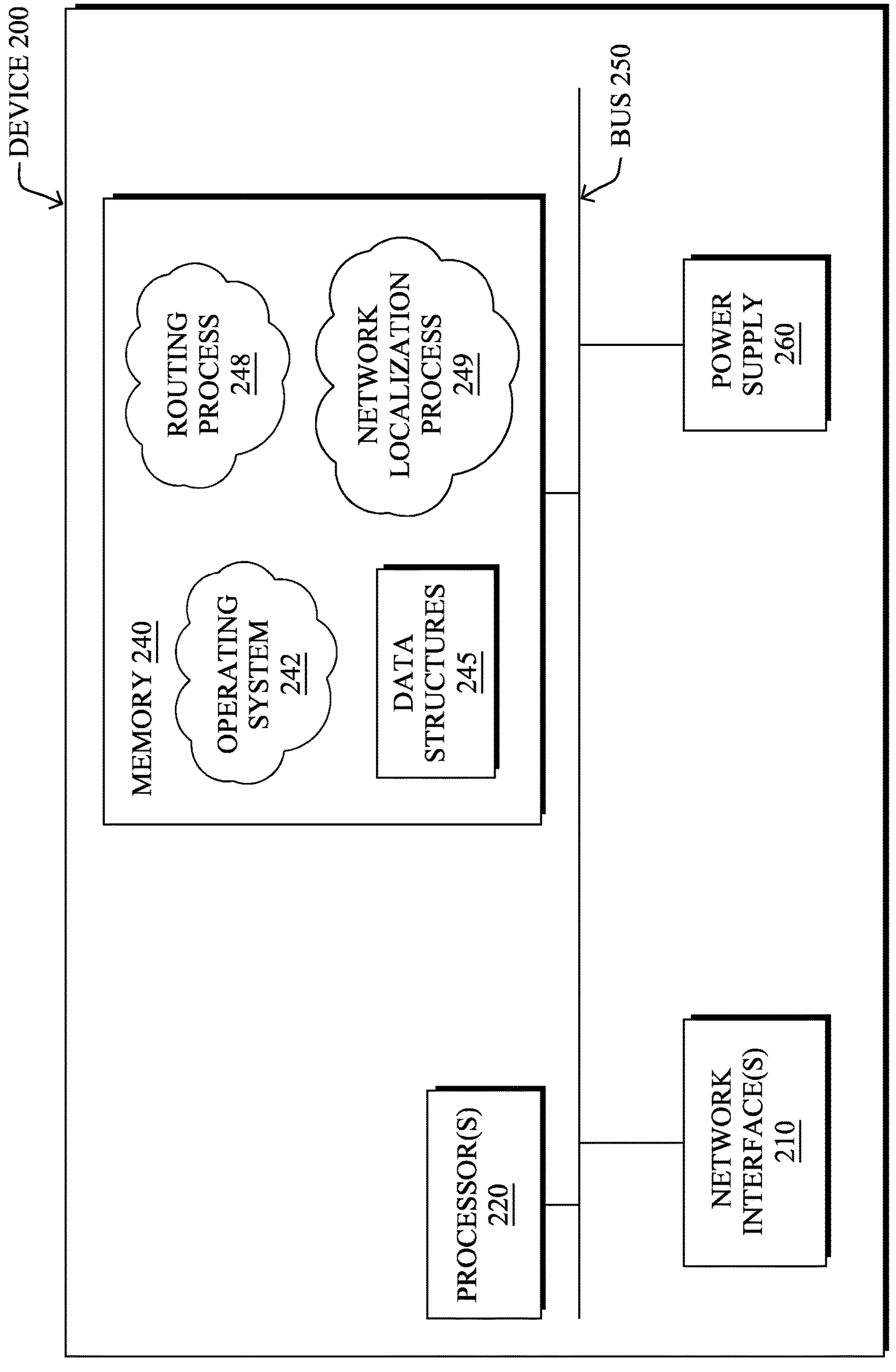
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a routing process 248 and/or a network localization process 249, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing process 248 contains computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 248 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, routing process 248 and/or network localization process 249 may include computer executable instructions that, when executed by processor(s) 220, cause device 200 to perform the techniques described herein. To do so, in some embodiments, routing process 248 and/or network localization process 249 may utilize artificial learning/machine learning. In general, artificial intelligence/machine learning is concerned with the design and the development of techniques that take as input empirical data (such as network statistics and performance indicators), and recognize complex patterns in these data. One very common pattern among these techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, routing process 248 and/or network localization process 249 may employ one or more supervised, unsupervised, or semi-supervised machine learning models. Generally, supervised learning entails the use of a training set of data, as noted above, that is used to train the model to apply labels to the input data. For example, the training data may include sample data that has been labeled as indicative of acceptable user experience or poor user experience. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that routing process 248 and/or network localization process 249 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises.

Consequently, a branch office or a campus can trigger massive loads on the network.

Figure 3A:
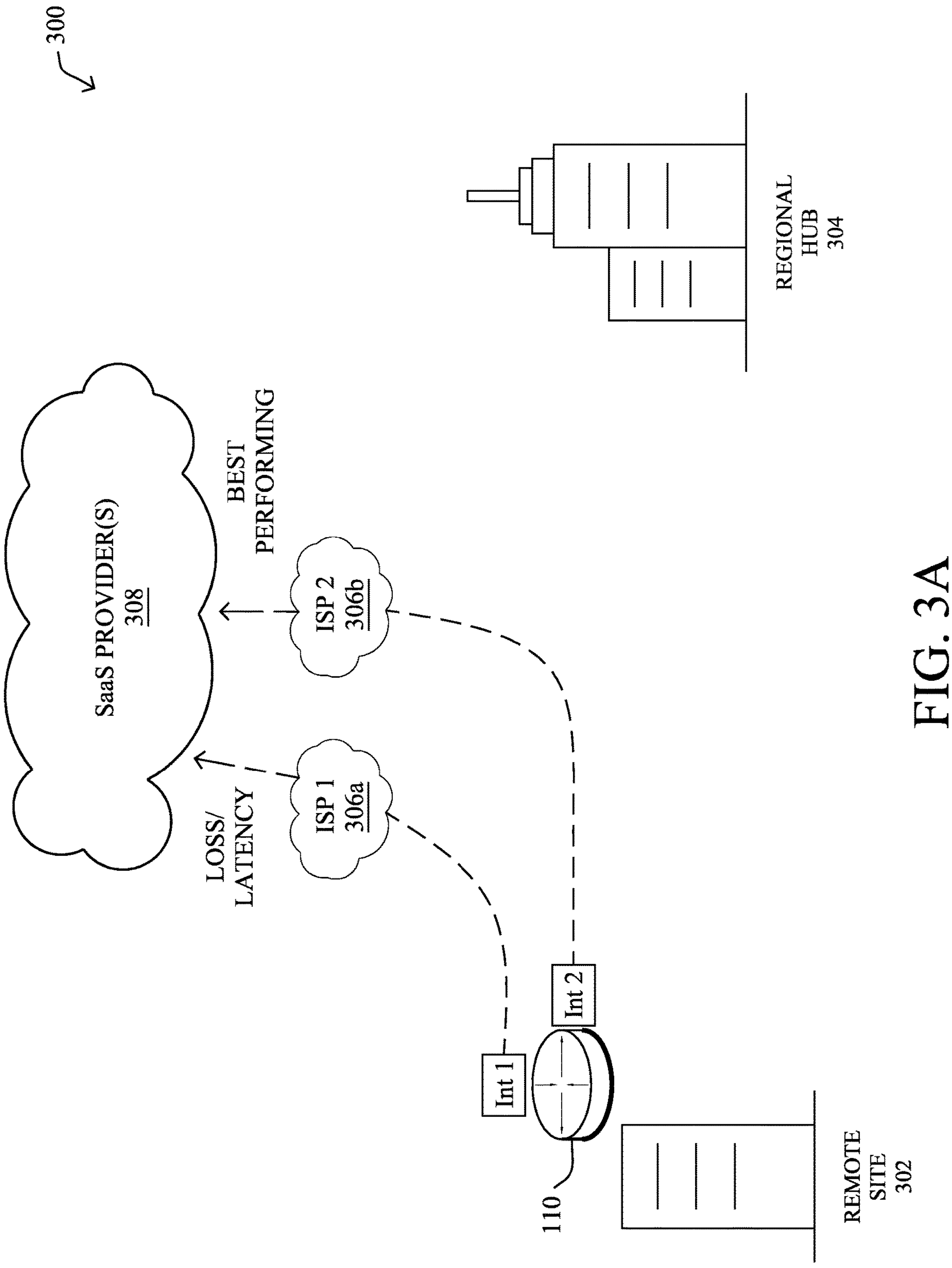
FIGS. 3A-3B illustrate example network deployments.
Figure 3B:
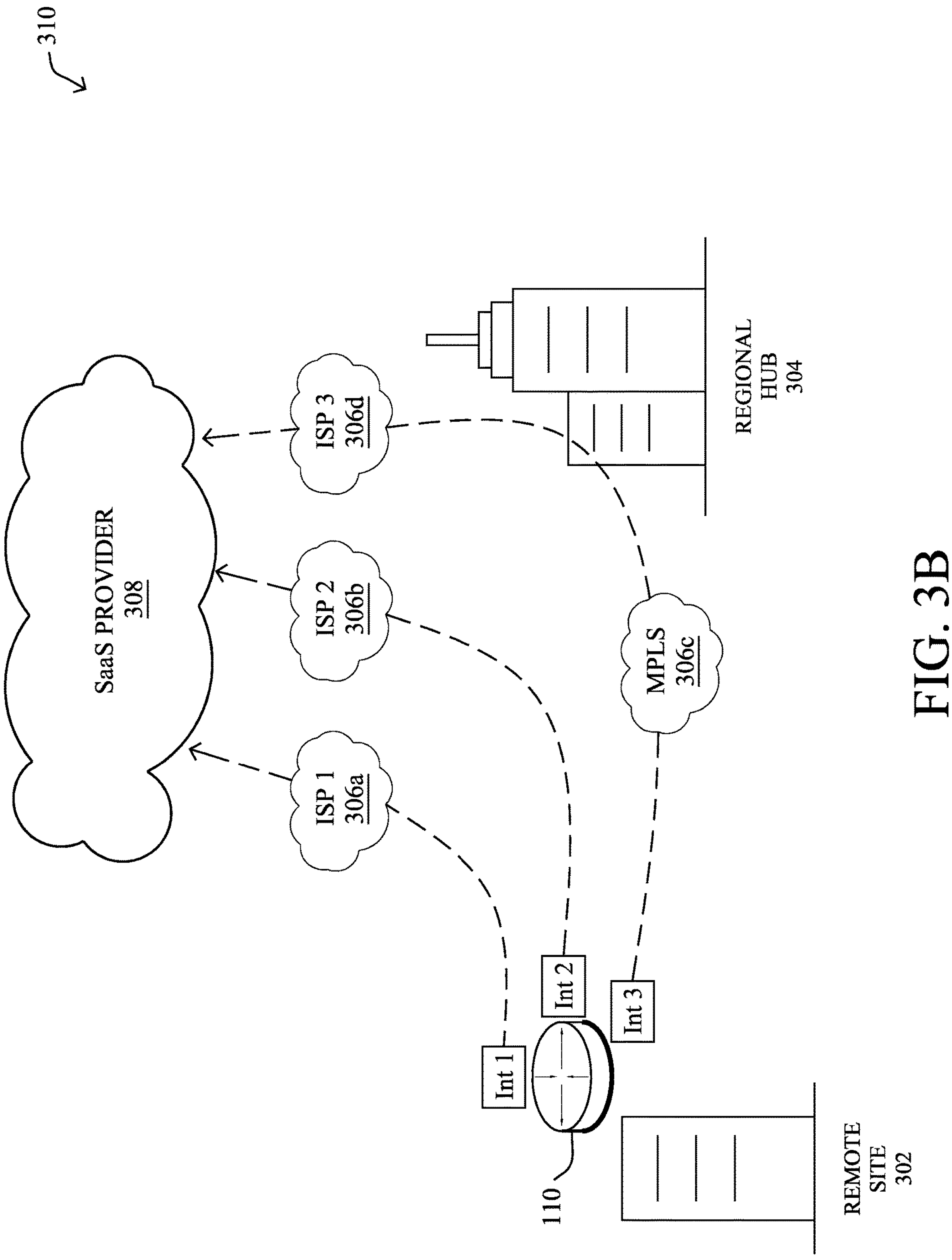

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306*a*, denoted ISP 1 in FIG. 3A. Likewise, a second interface of router 110, Int 2, may establish a backhaul path with SaaS provider(s) 308 via a second ISP 306*b*, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306*b*. In contrast to the example in FIG. 3A, Int 3 of router 110 may establish a third path to SaaS provider(s) 308 via a private corporate network 306*c* (e.g., an MPLS network) to a private data center or regional hub 304 which, in turn, provides connectivity to SaaS provider(s) 308 via another network, such as a third ISP 306*d*.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
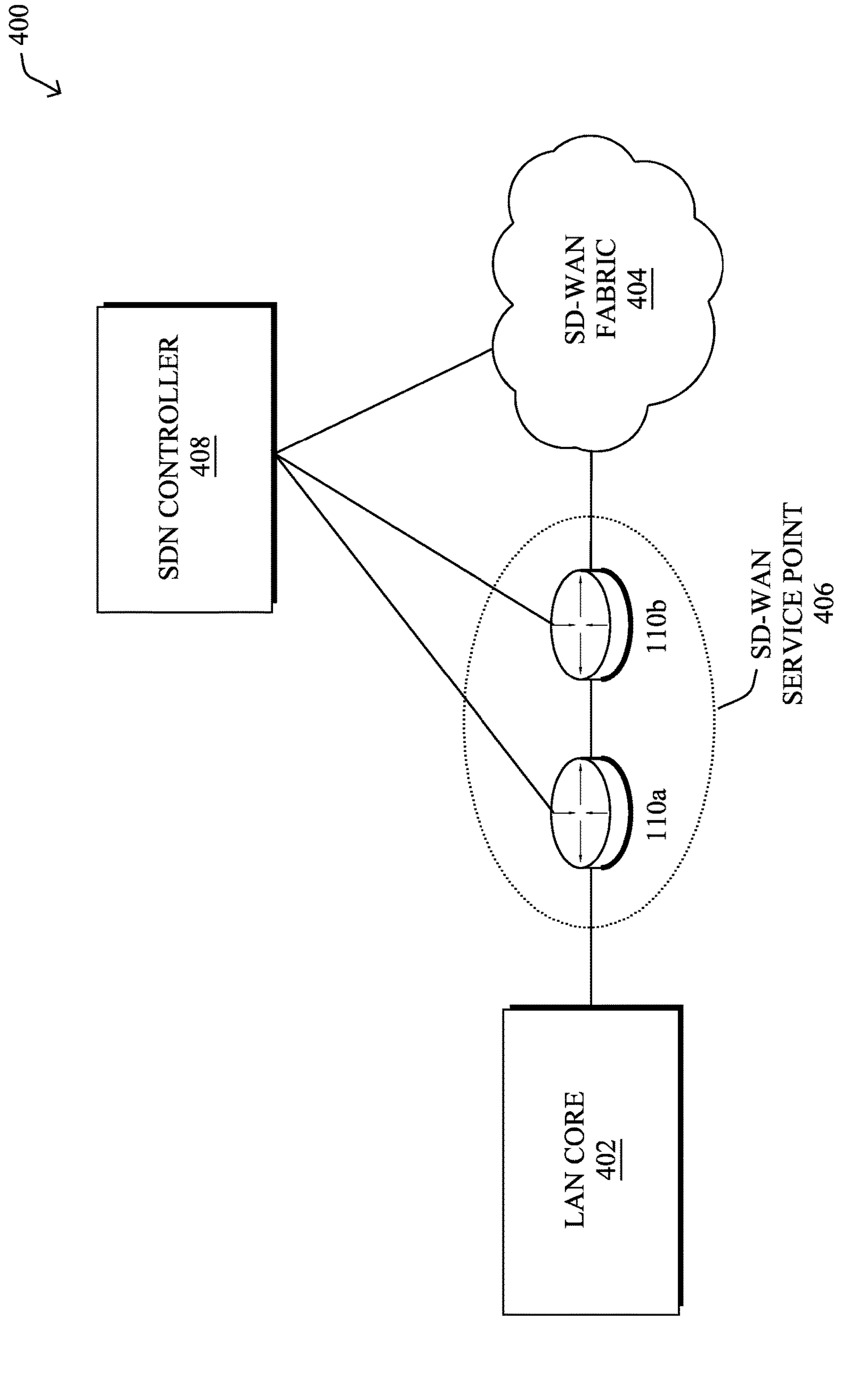
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110*a*-110*b*.

Overseeing the operations of routers 110*a*-110*b* in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

A primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoF) from the standpoint of the users of the application (i.e., the user experience).

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

- New in-house applications being deployed;
- New SaaS applications being deployed everywhere in the network, hosted by a number of different cloud providers;
- Internet, MPLS, LTE transports providing highly varying performance characteristics, across time and regions;
- SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

- The SLA for the application is 'guessed,' using static thresholds.
- Routing is still entirely reactive: decisions are made using probes that reflect the status of a path at a given time, in contrast with the notion of an informed decision.
- SLA failures are very common in the Internet and a good proportion of them could be avoided (e.g., using an alternate path), if predicted in advance.

Figure 4B:
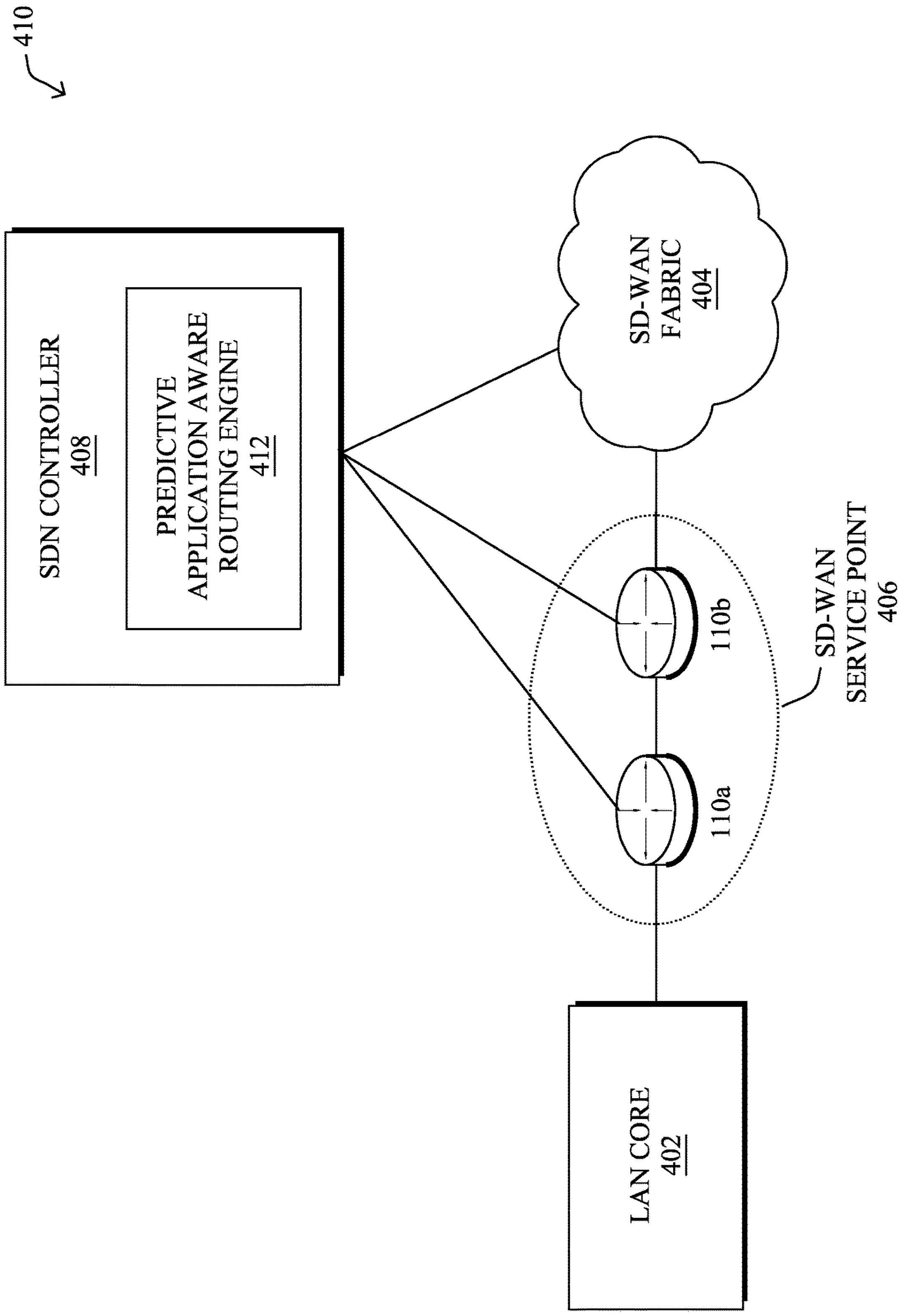

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of routing process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110*a*-110*b*, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application. In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As would be appreciated, modern SaaS applications are typically delivered globally via public cloud infrastructure using cloud native services. Even though public cloud providers may have a high number of points of presence (PoPs) and use those to deliver the application, globally. Still, testing has shown that user quality of experience (QoE) may vary greatly based on the location of the user. This is because all public cloud providers are delivering services which are region-based and applications are running in specific region(s) and location(s). Indeed, even though it might seem that an online application is global (e.g., because of its use of globally-available CloudFront POPs, etc.), in reality it might run in a single region/location and user experience might vary greatly based on the location.

To determine the QoE for a particular SaaS application, various approaches are possible such as:

- Obtaining user feedback directly from the application
- Applying traffic analytics, such as by analyzing Netflow records that include extra metrics like Application Response Time (ART)
- Sending synthetic path probes to measure networking metrics to each SaaS application from each location. These probes are 'synthetic' in that they seek to mimic the actual characteristics of the traffic of the application under scrutiny.
- Using hand-crafted heuristics based on domain expertise and other quantities (e.g., the concealment time)

In various embodiments, predictive application aware routing engine 412 may make use of any or all of the above approaches. For instance, predictive application aware routing engine 412 may make use of an API for a particular online application, allowing it to obtain application experience/QoE metrics directly from the application. Such metrics may be combined with probing results and/or path telemetry. This is in sharp contrast to network-centric approaches that do not necessarily reflect the true user experience.

As noted above, machine learning now makes it possible for application-aware predictive routing to be deployed to a network, to select the optimal path from the perspective of a particular online application. While FIG. 413 illustrates a centralized implementation whereby predictive application aware routing engine 412 is executed by SDN controller 408, it is also possible to execute predictive application aware routing engine 412 on an edge router (e.g., any of routers 110*a*-110*b*) or even an endpoint device (e.g., a cellular phone, a personal computer, etc.).

One key challenge in optimizing the model of predictive application aware routing engine 412 is that selection of the 'best' path for a given application is dependent on the network location of the given node (e.g., the endpoint, its associated router, etc.). In some embodiments, it may be possible to transfer the knowledge of one model optimized for a first network location to a model for use at another network location. Indeed, a new deployment of predictive application aware routing engine 412 to a node (e.g., as a routing/path selection agent) could be bootstrapped with knowledge accumulated by other similar agents, where the notion of similarity relates not only to the agent, but also to the environment at which the agent resides (e.g., its service providers, etc.). The ability to bootstrap a newly deployed routing agent with an existing model allows for the speed of learning to be significantly increased, potentially also combined with reinforcement learning.

For instance, a path selection agent deployed in a given neighborhood of a city with a given Internet Service Provider (ISP) might be a useful basis for bootstrapping other agents in the same neighborhood and access to the same ISP. In practice, the only piece of information available to the system to find matching agents is their public IP address. In some cases, IP addresses are a useful proxy of their locations (and situations) on the Internet and, by extension, of the quality of service delivered to different applications. In other cases, however, ISPs allocate IP addresses from the very same block to very different locations, even different cities.

Network Localization Based on Probing Results

The techniques herein introduce a mechanism to localize a network node based on probe results of probing conducted from the standpoint of that node to 'anchors' in the network. In some aspects, the localization can be used to support contextual awareness for a path selection mechanism (e.g., a predictive application-aware routing engine). Instead of relying on geolocation information or network topographical information, the techniques herein build a set of 'coordinates' that can be thought of as similar to geographical coordinates, but capture the abstract localization of the endpoint with respect to a variety of entities across the network. Such location information can be used across a variety of systems such as predictive networks, self-healing networks, network simplification systems, and the like.

Illustratively, the techniques described herein may be performed by hardware, software, and/or firmware, such as in accordance with network localization process 249, which may include computer executable instructions executed by the processor 220 (or independent processor of interfaces 210) to perform functions relating to the techniques described herein, such as in conjunction with routing process 248.

Specifically, according to various embodiments, a device obtains probe results generated by probing a plurality of entities in a network from a first node in the network. The device generates a location identifier for the first node that represents its location in the network, based on the probe results. The device selects a configuration associated with the first node for use by a second node in the network, based on a difference between the location identifier for the first node and a location identifier for the second node. The device causes the configuration to be deployed to the second node.

Operationally, in various embodiments, the techniques herein introduce a robust approach to obtaining so-called contextual awareness in the form of a compact representation and leveraging this representation to match similar path selection agents/models so that their knowledge can be used to bootstrap new ones. In various embodiments, the techniques herein rely on a one-shot probing of several key entities on the Internet such as services or routers, referred to herein as 'anchors.' In turn, the probe results can be used to derive a compact representation that can serve as 'coordinates' for the node. Such location information can then be used to identify other nodes that are similar or 'close' to the network location of the node.

In some embodiments, each agent/path selection model may be assigned different coordinates when performing this probing via different interfaces (e.g., ISP1 vs. ISP2, ISP1 via zScaler vs. ISP1 via Umbrella, etc.). As a result, these coordinates are entirely abstract and separate from those that one might associate with physical geography or even, to some extent, the network topology. Importantly, the resulting coordinates can be tailored for a given application, that is, two agent-interface pairs may be very 'close' to each other from the perspective of one application (e.g., WebEx), but quite 'distant' from the perspective of another application (e.g., Zoom). Such a distinction may be important, since the best path to reach a SaaS-based application is highly dependent on the SaaS application itself. More specifically, the techniques herein are able to capture the multi-faceted reality of the user experience, not just a specific aspect. Not only does it account for aspects such as throughput, jitter, availability, etc., but it also measures more than a single service involved in the delivery of an end user experience.

Figure 5:
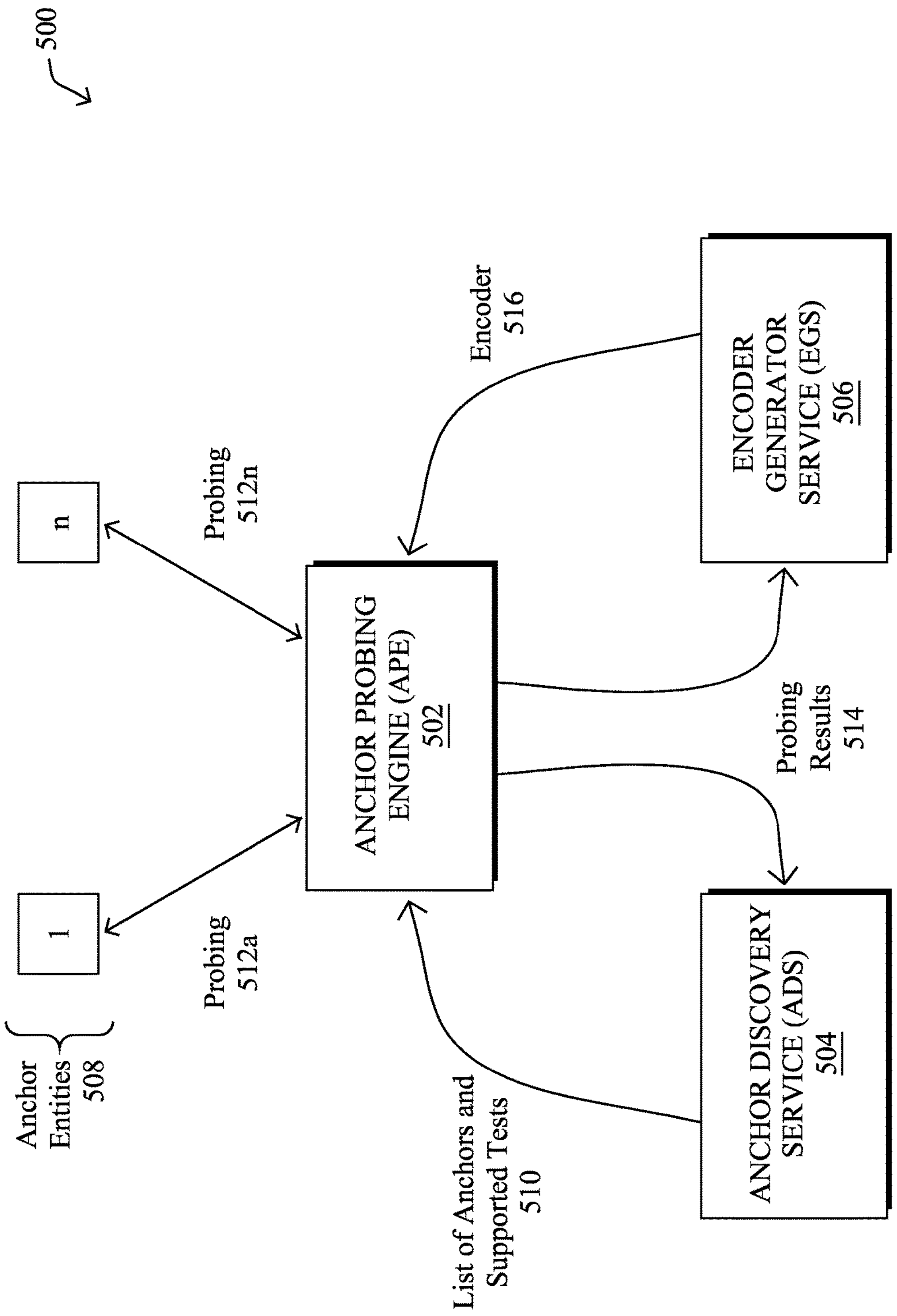
FIG. 5 illustrates an example architecture for network localization based on probing results.

FIG. 5 illustrates an example architecture 500 for network localization based on probing results, in various embodiments. As shown, architecture 500 may include an anchor probing engine (APE) 502, which may be executed by a node in the network, such as an edge router, mobile device, or any other node that may need contextual awareness. As would be appreciated, any number of APEs may be executed by any number of different nodes in the network, to capture probe results from their different perspectives. In general, a key function of APE 502 is to perform one-shot or periodical probing of anchor entities 508 in the network (e.g., a first through $n^{th}$ entity). In general, as described in greater detail below, anchor entities 508 may include various Internet services (e.g., application servers) and/or infrastructure components, such as routers, content delivery network (CDN) servers, DNS servers, etc.

In some embodiments, APE 502 may be configured to send a variety of probes to anchor entities 508. For instance, such probes may include, but are not limited to, any or all of the following:

- Internet Control Message Protocol (ICMP) Echo requests
- Bidirectional Forwarding Detection (BFD) probes
- TCP or UDP throughput testing probes
- Domain Name System (DNS) probes
- Hypertext Transfer Protocol (HTTP) request probes
- probes sent to a speedtest service
- etc.

Of course, the precise type(s) of probes sent to a given anchor entity 508 may depend on the type of anchor entity being probed. Accordingly, as shown, APE 502 may conduct probing **512*a*-512*n* with anchor entities 508 by sending probes to the respective entities and receiving probe results 514**, in response.

In one embodiment, the outcome of probing **512*a*-512*n* may be summarized by APE 502** as a single vector x of dimension Nx, which is then passed to an encoder ENCA(x) for application A that returns a code c of dimension Nc. The code c can then be used by several consumers (e.g., a predictive routing engine, etc.) as a set of 'coordinates' with respect to application A. Note that the dimensionality Nc of the code c is typically much smaller than the dimensionality Nx of the probe vector x.

In some embodiment, x may be a rank-2 tensor that captures the outcome of different probes over time. Here, the same idea applies: this tensor can be passed to an encoder that turns into a single compact code. Note that due to the curse of dimensionality, the original vector x is not suitable in itself to perform proper localization, as sparsity increases exponentially with the number of dimensions, thus making all measurements seemingly dissimilar in arbitrary ways and render distance functions essentially useless.

In some cases, APE 502 may have no specific intelligence to determine which anchor entities should be probed. Instead, the set of anchor entities 508 may be selected by anchor discovery service (ADS) 504. Similarly, APE 502 may obtains the encoder ENC (i.e., encoder 516 in FIG. 5) from another component called the Encoder Generator Service (EGS) 506. Typically, both ADS 504 and EGS 506 may be centrally hosted components of architecture 500, such as in the cloud or a data center. However, further embodiments, provide for their functionalities to be performed in a distributed manner and/or integrated into APE 502, directly.

In various embodiments, the goal of ADS 504 is to discover a list of entities across the Internet that are suitable as anchors. For instance, ADS 504 may impose the following constraint(s): they must allow for various types of probing (e.g., respond to pings, etc.) and/or be permanently available (e.g., routers, DNS servers, web servers). In addition, ADS 504 may also impose the constraint that the set of anchor entities 508 must cover a wide range of areas of the Internet.

The approach used by ADS 504 to accomplish this task may be somewhat similar to the strategy used by web crawlers, i.e. collecting IP addresses from relevant documents on the web (documentation of software products, cloud services, etc.). It then relies on a large cohort of APEs, such as APE 502, distributed across the world or other large area, to probe various IP addresses across the Internet.

The "quality" of a given anchor entity can then be assessed by ADS 504 in different ways, such as either of the following, in various embodiments:

Using a notion of diversity: the more diverse an anchor is from the known set of anchors, the more valuable it is. This can be expressed as the information gain obtained from a given anchor with respect to the rest of them. In particular, given an anchor A that lead to a set $X_A$ of measurement [$x_{1,A}$, $x_{2,A}$, . . . , $x_{K,A}$] obtained from K-number of APEs, the information of X can be computed as $IG(X_A)=H(\ ), H(|X_A)$ where={$X_1$, $X_2$, . . . } denotes the set of all anchors and H( ) is the entropy operator.

Using feature selection in a predictive model: the other approach is to construct a feature vector X out of the set of all anchors S wherein each feature can be traced by to a unique anchor. Note that it does not have to be a bijection, that is, a given anchor can be represented by multiple features, but not the other way around. This feature vector can then be used to predict some relevant quantity related to the user experience of various applications. By applying a constraint of sparsity on the number of anchors that are allowed (e.g., L1 regularization), ADS 504 can then force the model to use only a subset of the candidate anchors to solve the problem. Those anchors that are more often selected by the model are included in the final list of anchors.

In either case, ADS 504 may propagates the list 510 of anchor entities and their supported tests (e.g., HTTP probing, BFD probing, etc.) to APE 502, to control which anchor entities 508 are probed by APE 502 and how it conducts probing 512.

In various embodiments, EGS 506 may compute an application-specific encoder ENCA (encoder 516) and distribute it to the APEs, such as APE 502. The encoder 516 typically takes the form of a neural network with Nx neurons as input and Nc neurons as output. The fundamental idea behind the ENC is that (agent, interface) pairs that share similar experiences of a given application have a similar code, i.e. the l2-norm ||c1-c2|| is small.

One approach to learn encoder 516 is via self-supervised learning (SSL) followed by a second phase of supervised refinement. This can be done by masking portions of the input (e.g., setting all inputs coming for a subset of the anchors to zero) and using a contrastive loss to train the encoder to maximize the mutual information between the input and the code for true samples and maximize the divergence between the input and the code for negative examples. Typically, this first stage of unsupervised training is already sufficient to provide a useful code, but it can be refined in a supervised fashion. There are many architectures and strategies that could be used for this purpose, but one proposed implementation is a Siamese network (i.e., the same network duplicated with weight sharing) taking each two inputs x1 and x2 and trained using a loss that is given by the absolute difference between the l2-norm of their codes ||c1-c2|| and the correlation coefficient of their user experience scores corr(ues1, ues2) where the pairs of samples (x1, x2) are selected randomly across the dataset. The resulting encoder 516 is then pushed by EGS 506 to the APEs, such as APE 502.

Both the list 510 of anchors and encoder 516 can be in principle updated regularly, but a level of coordination may be required. For instance, EGS 506 may recompute a new encoder whenever ADS 504 adds or removes an anchor from the set of anchor entities 508. Such coordination could be achieved through the use of a central orchestrator, in one embodiment. Indeed, in some implementations, ADS 504 and EGS 506 may not communicate directly with the APEs but may first communicate their respective models to a central orchestrator, which would then push them to the APEs, such as APE 502. Similarly, the orchestrator may feature administrative and monitoring capabilities that allows network operators to manage the entire system.

According to various embodiments, the localization techniques implemented by architecture 500 in FIG. 5 can be leveraged in the context of predictive networks. For instance, upon deploying a predictive engine to a network node in some location C, a APE can be executed at that location (e.g., by the node, another device at location C, etc.), to obtain the set of coordinates c. These coordinates can then be used by the node to retrieve pre-trained models that correspond to this specific "region" of the network. Furthermore, the coordinates c can be used as input features to local predictive models for higher accuracy.

Figure 6:
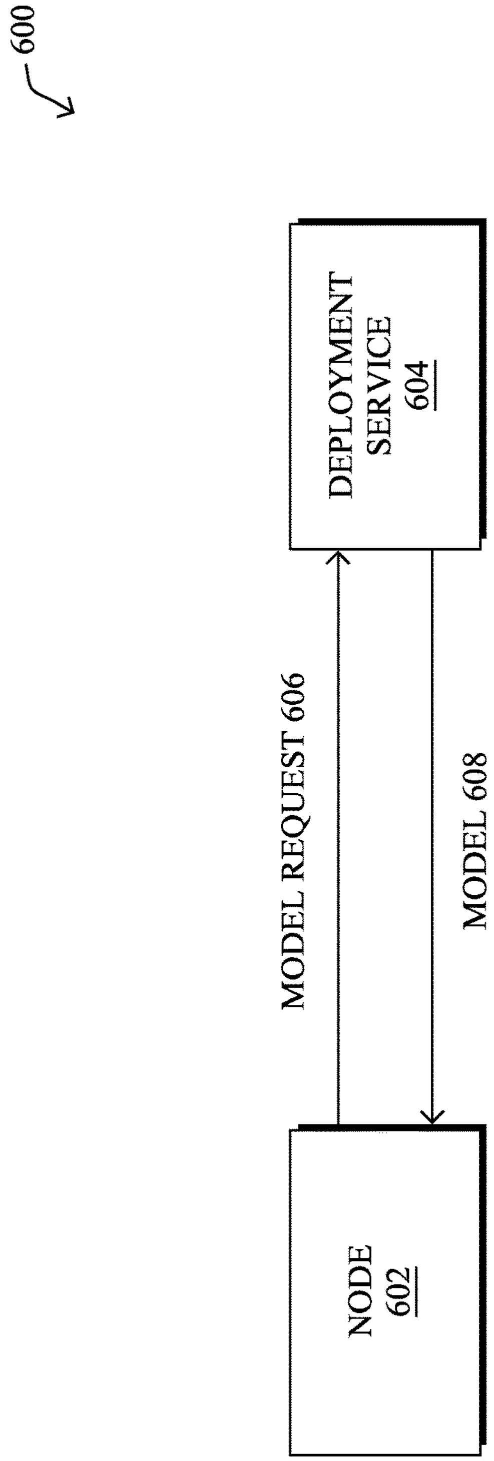
FIG. 6 illustrates an example of using localization information to request a prediction model.

FIG. 6 illustrates an example of using localization information to request a prediction model, according to various embodiments. As shown, a node 602 may send a model request 606 to a deployment service 604. Such a model request 606 may include the output of an APE executed locally by node 602. This output can be used by deployment service 604 to compare the network location of node 602 to that of other nodes. Based on this comparison, deployment service 604 may then select a model 608 from the 'closest' node to that of node 602 and return it to node 602.

According to various embodiments, APEs could also be executed by home routers (e.g., Meraki Virtual Office) or software agents (e.g., AnyConnect). In such cases, they may signal their ability to act as an APE using DNS or other suitable protocols. The cohort of APEs could then be globally managed to collect telemetry on anchors across the world and providing a global "map" featuring the health of a broad range of applications, services from across different regions of the Internet. The resulting map, and the coordinates of a given device can be presented for display and used by network operators for troubleshooting or management purposes. Given the direct interpretations as a Euclidean distance, they can use those coordinates to group similar (agent, interface) pairs or, on the contrary, identify outliers. Using data analysis, they may correlate support cases, customer satisfaction, technical issues, or any other relevant business metric with the contextual location of the endpoints of interest.

In further embodiments, the localization of one node in a network in accordance with the techniques herein can also be used for other purposes and/or in other mechanisms, beyond predictive routing. Indeed, the network 'location' of the node could also be used for any or all of the following:

Selecting a preferred list of servers for a given online application

A list of SIG/VPN endpoints

Determining the ideal schedules for specific application workloads (e.g., backups)

Determining the ideal choice and parameters for the application (e.g., codec configuration for voice)

Etc.

In other words, the techniques herein allow for the deployment of a routing configuration to a node in a network, based on its proximity to another node in the network. Such a configuration may be a static or other defined routing policy, a predictive routing model that is used to make routing decisions, dynamically, a configuration that specifies application-specific parameters, or the like.

Figure 7:
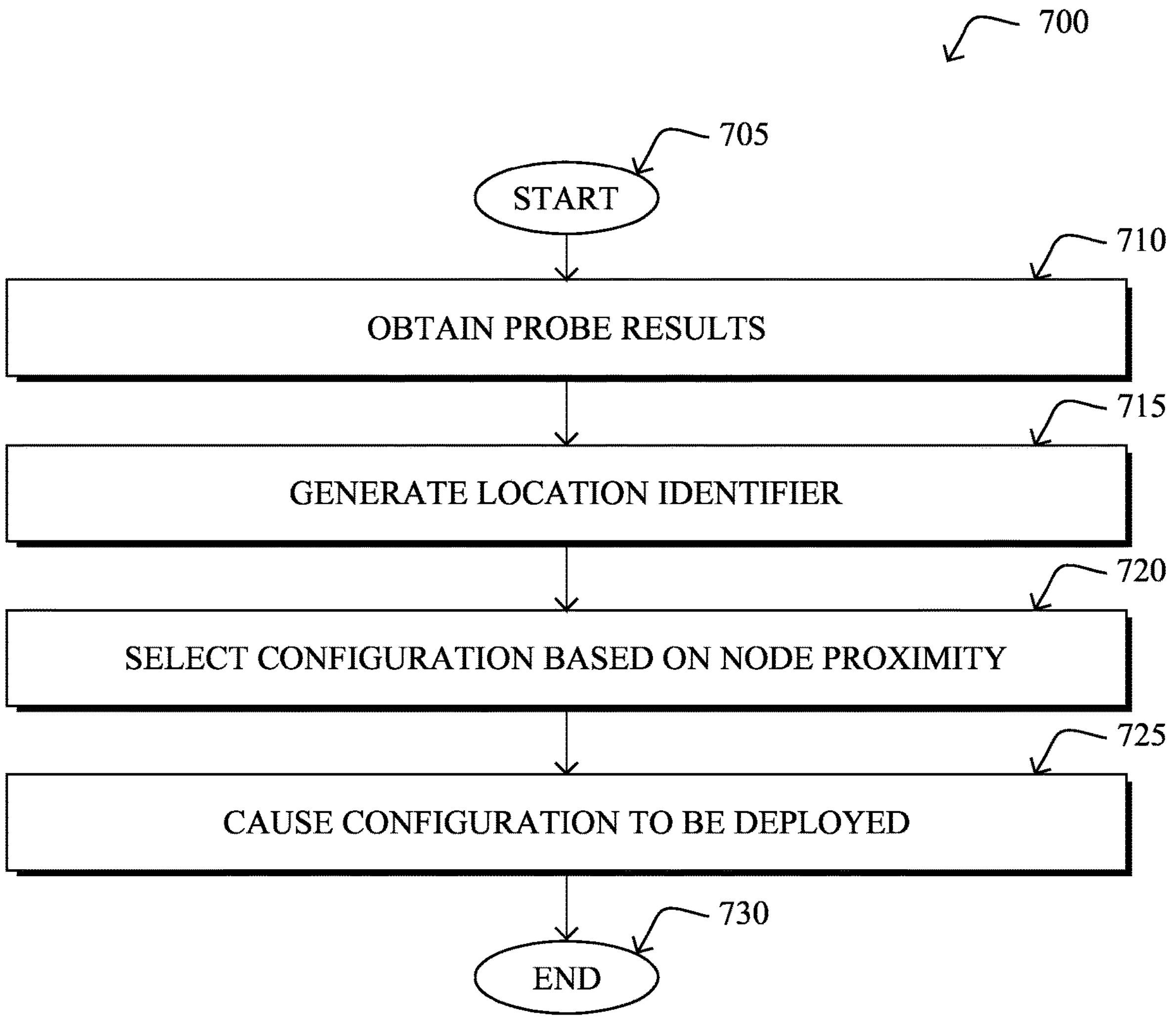
FIG. 7 illustrates an example simplified procedure for network localization based on probing results.

FIG. 7 illustrates an example simplified procedure 700 (e.g., a method) for network localization based on probing results, in accordance with one or more embodiments described herein. For example, a non-generic, specifically configured device (e.g., device 200) may perform procedure 700 by executing stored instructions (e.g., network localization process 249). The procedure 700 may start at step 705, and continues to step 710, where, as described in greater detail above, the device may obtain probe results generated by probing a plurality of entities in a network from a first node in the network. In various embodiments, the plurality of entities comprises one or more of: a particular application server, a particular router, a particular Domain Name System (DNS) server, or a particular Content Delivery Network (CDN) server. In some embodiments, entities in the plurality of entities are selected based in part on their availability on the network and based in part on whether they are configured to respond to probes.

At step 715, as detailed above, the device may generate a location identifier for the first node that represents its location in the network, based on the probe results. In some embodiments, the plurality of entities are probed by sending probes to the plurality of entities comprising at least one of: Internet Control Message Protocol (ICMP) probes, Bidirectional Forwarding Detection (BFD) probes, Domain Name System (DNS) probes, Hypertext Transfer Protocol (HTTP) probes, or speedtest probes.

At step 720, the device may select a configuration associated with the first node for use by a second node in the network, based on a difference between the location identifier for the first node and a location identifier for the second node (i.e., the proximity of the nodes), as described in greater detail above. In some embodiments, the location identifier for the first node and the location identifier for the second node are associated with a particular online application. In one embodiment, the location identifier for the second node is generated based on probe results generated by probing the plurality of entities in the network from the second node in the network. In some embodiments, the difference between the location identifier for the first node and the location identifier for the second node is computed using a neural network. In some embodiments, the second node comprises a router or user device.

At step 725, as detailed above, the device may cause the predictive routing model to be deployed to the second node. In one embodiment, the configuration comprises a predictive routing model associated with the first node and the second node uses its location identifier as input to the predictive routing model. In some embodiments, providing, by the device, a map visualization for display that is based in part on the location identifier for the first node and the location identifier for the second node. Procedure 600 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for network localization based on probing results, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:

obtaining, by a device, probe results generated by probing, by a first node in a network, one or more anchor entities in the network;

generating, by the device, a location identifier for the first node that represents its location in the network relative to the one or more anchor entities, wherein the location identifier is computed as a function of the probe results obtained from the one or more anchor entities in response to the probing by the first node, and wherein generating the location identifier for the first node comprises applying the probe results to an encoder to generate the location identifier as a compact representation of the probe results;

selecting, by the device, a configuration associated with the first node for use by a second node in the network, based on a difference between the location identifier for the first node and a location identifier for the second node; and causing, by the device, the configuration to be deployed to the second node.

2. The method as in claim 1, wherein the one or more anchor entities comprises one or more of:

a particular application server, a particular router, a particular Domain Name System (DNS) server, or a particular Content Delivery Network (CDN) server.

3. The method as in claim 1, wherein the one or more anchor entities are selected from a plurality of entities probed by the first node, based in part on their availability on the network and based in part on whether they are configured to respond to probes.

4. The method as in claim 1, wherein the location identifier for the first node and the location identifier for the second node are associated with a particular online application.

5. The method as in claim 1, wherein the location identifier for the second node is generated based on probe results generated, by probing the one or more anchor entities in the network, from the second node in the network.

6. The method as in claim 1, wherein the one or more anchor entities are probed by sending probes to the one or more anchor entities comprising at least one of:

Internet Control Message Protocol (ICMP) probes, Bidirectional Forwarding Detection (BFD) probes, Domain Name System (DNS) probes, Hypertext Transfer Protocol (HTTP) probes, or speedtest probes.

7. The method as in claim 1, wherein the configuration comprises a predictive routing model associated with the first node, and wherein the second node uses its location identifier as input to the predictive routing model.

8. The method as in claim 1, wherein the difference between the location identifier for the first node and the location identifier for the second node is computed using a neural network.

9. The method as in claim 1, further comprising:

providing, by the device, a map visualization for display that is based in part on the location identifier for the first node and the location identifier for the second node.

10. The method as in claim 1, wherein the second node comprises a router or user device.

11. An apparatus, comprising:

one or more network interfaces to communicate with a network;

a processor coupled to the one or more network interfaces and configured to execute one or more processes; and a memory configured to store a process that is executable by the processor, the process when executed configured to:

obtain probe results generated by probing, by a first node in a network, one or more anchor entities in the network;

generate a location identifier for the first node that represents its location in the network relative to the one or more anchor entities, wherein the location identifier is computed as a function of the probe results obtained from the one or more anchor entities in response to the probing by the first node, and wherein generating the location identifier for the first node comprises applying the probe results to an encoder to generate the location identifier as a compact representation of the probe results;

select a configuration associated with the first node for use by a second node in the network, based on a difference between the location identifier for the first node and a location identifier for the second node; and cause the configuration to be deployed to the second node.

12. The apparatus as in claim 11, wherein the one or more anchor entities comprises one or more of:

a particular application server, a particular router, a particular Domain Name System (DNS) server, or a particular Content Delivery Network (CDN) server.

13. The apparatus as in claim 11, wherein the one or more anchor entities are selected from a plurality of entities probed by the first node, based in part on their availability on the network and based in part on whether they are configured to respond to probes.

14. The apparatus as in claim 11, wherein the location identifier for the first node and the location identifier for the second node are associated with a particular online application.

15. The apparatus as in claim 11, wherein the location identifier for the second node is generated based on probe results generated, by probing the one or more anchor entities in the network, from the second node in the network.

16. The apparatus as in claim 11, wherein the one or more anchor entities are probed by sending probes to the one or more anchor entities comprising at least one of:

Internet Control Message Protocol (ICMP) probes, Bidirectional Forwarding Detection (BFD) probes, Domain Name System (DNS) probes, Hypertext Transfer Protocol (HTTP) probes, or speedtest probes.

17. The apparatus as in claim 11, wherein the configuration comprises a predictive routing model associated with the first node, and wherein the second node uses its location identifier as input to the predictive routing model.

18. The apparatus as in claim 11, wherein the difference between the location identifier for the first node and the location identifier for the second node is computed using a neural network.

19. The apparatus as in claim 11, wherein the process when executed is further configured to:

provide a map visualization for display that is based in part on the location identifier for the first node and the location identifier for the second node.

20. A tangible, non-transitory, computer-readable medium storing program instructions that cause a device to execute a process comprising:

obtaining, by the device, probe results generated by probing, by a first node in a network, one or more anchor entities in the network;

generating, by the device, a location identifier for the first node that represents its location in the network relative to the one or more anchor entities, wherein the location identifier is computed as a function of the probe results obtained from the one or more anchor entities in response to the probing by the first node, and wherein generating the location identifier for the first node comprises applying the probe results to an encoder to generate the location identifier as a compact representation of the probe results;

selecting, by the device, a configuration associated with the first node for use by a second node in the network, based on a difference between the location identifier for the first node and a location identifier for the second node; and causing, by the device, the configuration to be deployed to the second node.

* * * * *